United States Patent [19]

Hirohata et al.

[11] Patent Number: 4,534,638
[45] Date of Patent: Aug. 13, 1985

[54] EXPOSURE CONTROL DEVICE FOR CAMERA

[75] Inventors: Michio Hirohata; Hideo Ikari, both of Tokyo, Japan

[73] Assignee: Canon Kabushiki Kaisha, Japan

[21] Appl. No.: 636,789

[22] Filed: Aug. 1, 1984

Related U.S. Application Data

[63] Continuation of Ser. No. 414,634, Sep. 3, 1982, abandoned.

[30] Foreign Application Priority Data

Sep. 12, 1981 [JP] Japan .................. 56-144268

[51] Int. Cl.$^3$ .................. G03B 7/08; G03B 7/93; G03B 9/14
[52] U.S. Cl. .................. 354/418; 354/427; 354/431; 354/440
[58] Field of Search .................. 354/418, 420, 424, 427, 354/431, 435, 440, 421, 437, 436

[56] References Cited

U.S. PATENT DOCUMENTS 4,192,595  3/1980  Wakazono et al. ............. 354/418 X
4,258,990  3/1981  Arisaka et al. ............. 354/436
4,317,624  3/1982  Shenk ............. 354/421 X Primary Examiner—L. T. Hix
Assistant Examiner—Della J. Rutledge
Attorney, Agent, or Firm—Toren, McGeady, Stanger, Goldberg & Kiel

[57] ABSTRACT

The disclosed camera has shutter blades which also serve as diaphragm blades and an auxiliary light-metering aperture arranged, upon operation of the shutter blades, to be opened and closed depending upon opening and closing of a main aperture which lies in the path of light from an object to be photographed to a film. A photo-interpreter composed of a light projection element and a photosensitive element optico-electrically detects the size of the opening of the main aperture of the shutter blades. Once the auxiliary aperture has assumed a totally light blocking state from a pre-opened state, the photo-interpreter produces an output signal that initiates counting of light metering data. During flash photography, a flash device is triggered with a timing to make a proper exposure with a signal representing the required aperture value as detected by the photo-interpreter.

4 Claims, 8 Drawing Figures

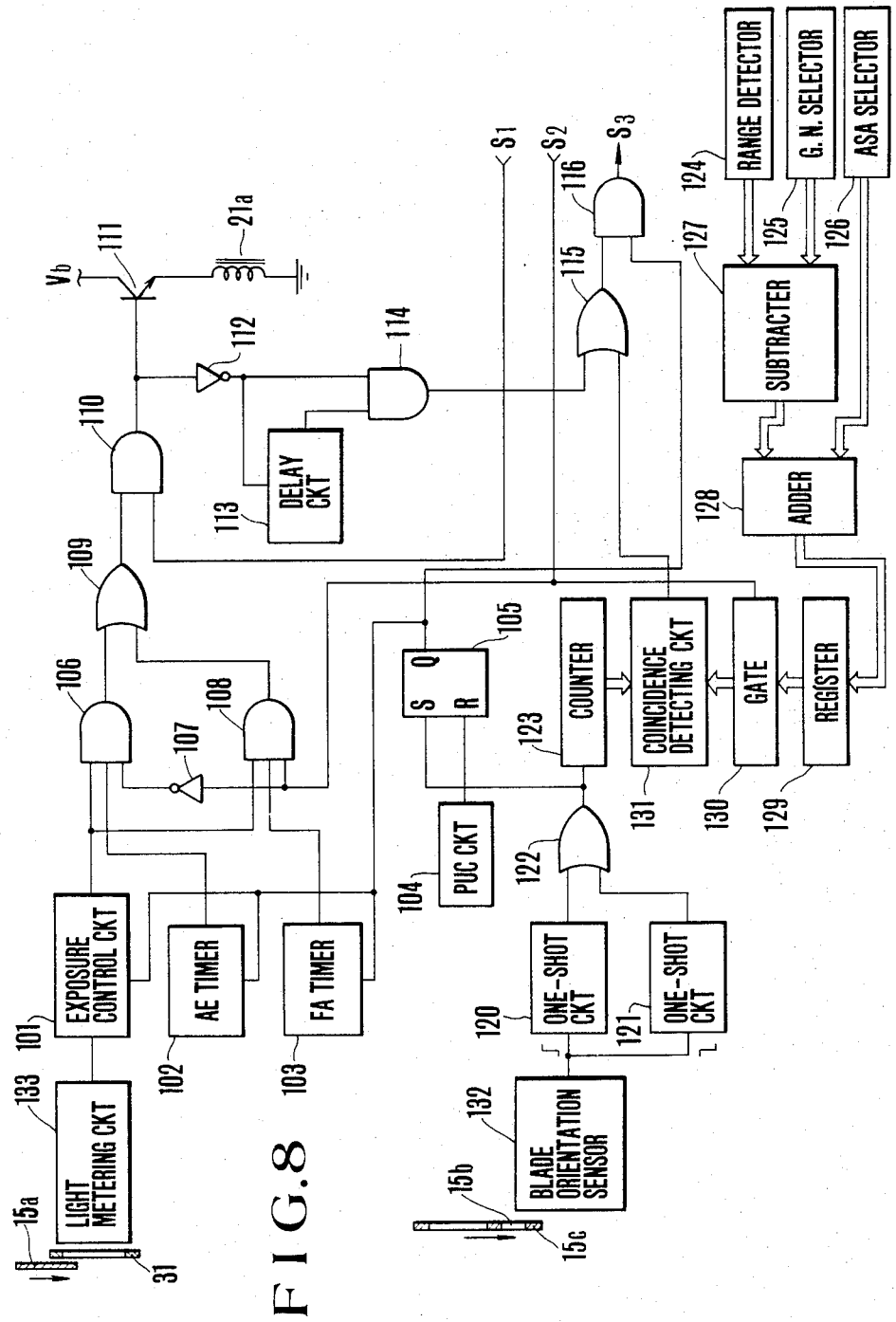
F I G. 8

EXPOSURE CONTROL DEVICE FOR CAMERA

This is a continuation of application Ser. No. 414,634, filed Sept. 3, 1982, abandoned.

BACKGROUND OF THE INVENTION

1. Field of the Invention

This invention relates to exposure control devices for cameras and more particularly to exposure control devices for cameras having half-open type shutters whose blades, upon opening and closing, also serve as diaphragm blades to control the exposure.

2. Description of the Prior Art

In cameras having diaphragm-cum-shutter blades or so-called half-open type shutters, where exposures dependent upon the opening and closing of the shutter blades are accurately controlled with light metering information, a photosensitive element is placed in the optical path and a diaphragm in the form of an auxiliary aperture is arranged to open and close when the main diaphragm aperture for exposure of film opened and closed, so that the amount of light to the photosensitive element can be varied in proportion to the amount of light to the film. However, because the auxiliary diaphragm aperture is closed before initiation of the opening of the shutter blades, it becomes impossible to presense the level of brightness of an object to be photographed just before actuation of a shutter release to detect an inadequate brightness level and produce a warning signal.

To solve this problem, it is necessary that the auxiliary diaphragm aperture be opened before the shutter is release. Upon initiation of a shutter blade opening operation, it is necessary to change the auxiliary aperture from the pre-opened state to a totally closed state and to have an exposure control circuit control the closing operation of the shutter by starting to count light-metering information with a photosensitive element. However, a mechanical count start switch cooperating with the shutter blades is disadvantageous to the reliability of the opening operation of the shutter blades because it shocks the shutter blades when actuated. It also adversely affects the accuracy of exposure control because the timing of actuation becomes unstable. Therefore, it has been the conventional practice, for example, to utilize the change in the output of the photosensitive element of the light meter resulting from the shutter operation's changing the opening area of the auxiliary diaphragm aperture from the pre-opened state to the totally closed state in actuating the exposure control circuit to initiate a counting operation, as proposed in U.S. Pat. No. 4,258,990 (issued Mar. 31, 1981).

However, such devices, because they determine when the counting operation starts on the basis of the output of the photosensitive element in the light meter, are unsuitable for night photography. This is so because the object brightness is so low that the output of the photosensitive element with the pre-opened auxiliary diaphragm aperture is almost equal to that with the auxiliary diaphragm aperture totally closed. Hence, the possibility of being unable to detect the difference between the two outputs exists. For this reason, one may encounter quite a few photographic situations where such a device is unreliable for starting a counting operation.

It may also be possible to employ a timer circuit responsive to initiation of a shutter operation for starting the count and for producing an actuating signal for the exposure control circuit at the time necessary for moving the auxiliary diaphragm aperture from the pre-opened position to the totally closed position. However, such a method requires always opening the shutter blades at a constant speed and also strictly adjusting the timing of actuation of each mechanical part. These requirements are difficult to fulfill.

SUMMARY OF THE INVENTION

With the foregoing in mind, it is an object of the present invention to provide an exposure control device for a camera which eliminates the above-described drawbacks of conventional devices by using detecting means comprising a light projection element to detect the size of an aperture opening defined by blade members of a half-open type shutter and by determining when a counting operation of an exposure control circuit is initiated based on the one of the outputs of the detecting means which is produced when the auxiliary diaphragm aperture is once totally closed from the pre-opened state.

Another object of the present invention is to provide an exposure control device for a camera without having to increase the axial thickness of such half-open type shutter by making the light from the light projection element reflect from the blade member and directing it to the photosensitive element so that the light projection element and the photosensitive element may be positioned on the same side of the blade members.

Still another object of the present invention is to provide an exposure control device for a camera capable of a proper flash exposure with complex illumination in daylight by firing a flash device to superimpose flash illumination on daylight illumination at a time depending upon the output of the aforesaid detecting means when the blade members have opened to a position for the required aperture value to the proper flash exposure.

These and other objects of the present invention will become apparent from the following description of embodiments thereof.

BRIEF DESCRIPTION OF THE DRAWINGS

FIG. 8 is an electrical circuit diagram, partly in block form, of an embodiment of an exposure control circuit of the camera according to the present invention.

DETAILED DESCRIPTION OF THE PREFERRED EMBODIMENTS

The present invention is described in greater detail with reference to the drawings.

Figure 1:
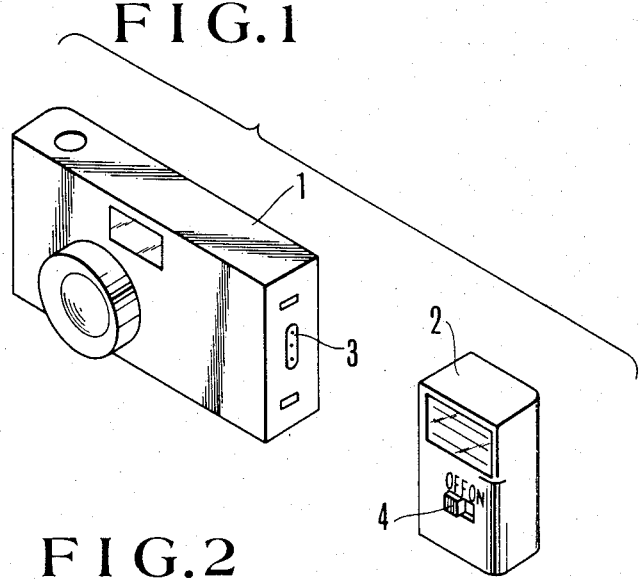
FIG. 1 is a perspective view of the camera of the invention.

FIG. 1 is a perspective view illustrating the outer appearance of the camera according to the present invention. To minimize the bulk and size of the camera, a flash device is not incorporated within the camera, but to make a flash exposure, a suitably adapted flash device is releasably attached to the outside of the camera. The drawing shows a camera body 1 and a flash unit 2. A plug board 3 includes an X contact carrying a trigger signal to be transmitted from the camera body 1 to the flash unit 2 for firing a discharge tube in the flash unit 2, a flash-auto (FA) changeover contact which receives a signal representing the fact that a main condenser in the flash unit 2 has been fully charged from the flash unit 2 to the camera body, and a common ground line. These make the camera body 1 and the flash unit 2 synchronizable with each other.

Figure 2:
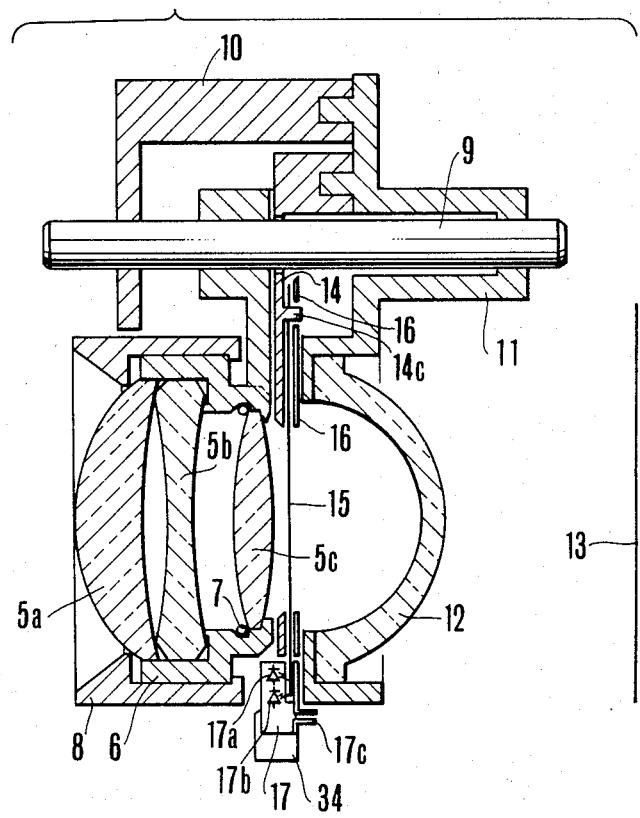
FIG. 2 is a sectional view of the lens mounting mechanism in the camera of FIG. 1.

FIG. 2 is an axial sectional view of the camera according to the present invention where 5a, 5b and 5c are lens components constituting a front assembly of a photographic objective. These are contained in a lens holder 6 in fixedly secure realtion by a ring 7, a retainer 8 and the like.

The lens holder 6 is formed as a unit with a barrel bar 9. The barrel bar 9 is slidably supported by a front base plate 10 and a rear base plate 11, so that the objective lens can be moved to effect focusing under the action of a focusing control mechanism (not shown). The rear base plate 11 fixedly carries a rear lens assembly 12 cooperative with the front assembly of lenses 5a, 5b and 5c to form an image of the object on a photographic film 13.

A shutter mechanism is incorporated into a space between the front assembly of lenses 5a, 5b and 5c and the rear assembly of lens 12. That is, a shutter base plate 14, shutter blades 15 which also serve as diaphragm blades, and a shutter blade suppressor 16 are positioned therein, and the shutter blades 15 are arranged for rotation about pivot pins 14c on the shutter base plate 14. A photo-interpreter 17 includes an LED 17a for light projection and an SPC 17b for light reception packaged with electrical terminals 17c connected to an exposure control circuit to be described.

The photo-interpreter 17 is a reflection device in which light emitted from the light projection LED 17a passes through a slit 15b in the shutter blade 15 to the shutter blade suppressor 16, or a reflector previously mounted to the photointerpreter 17 as a unit with its holding member and reflected to the SPC 17b therefrom.

Figure 3:
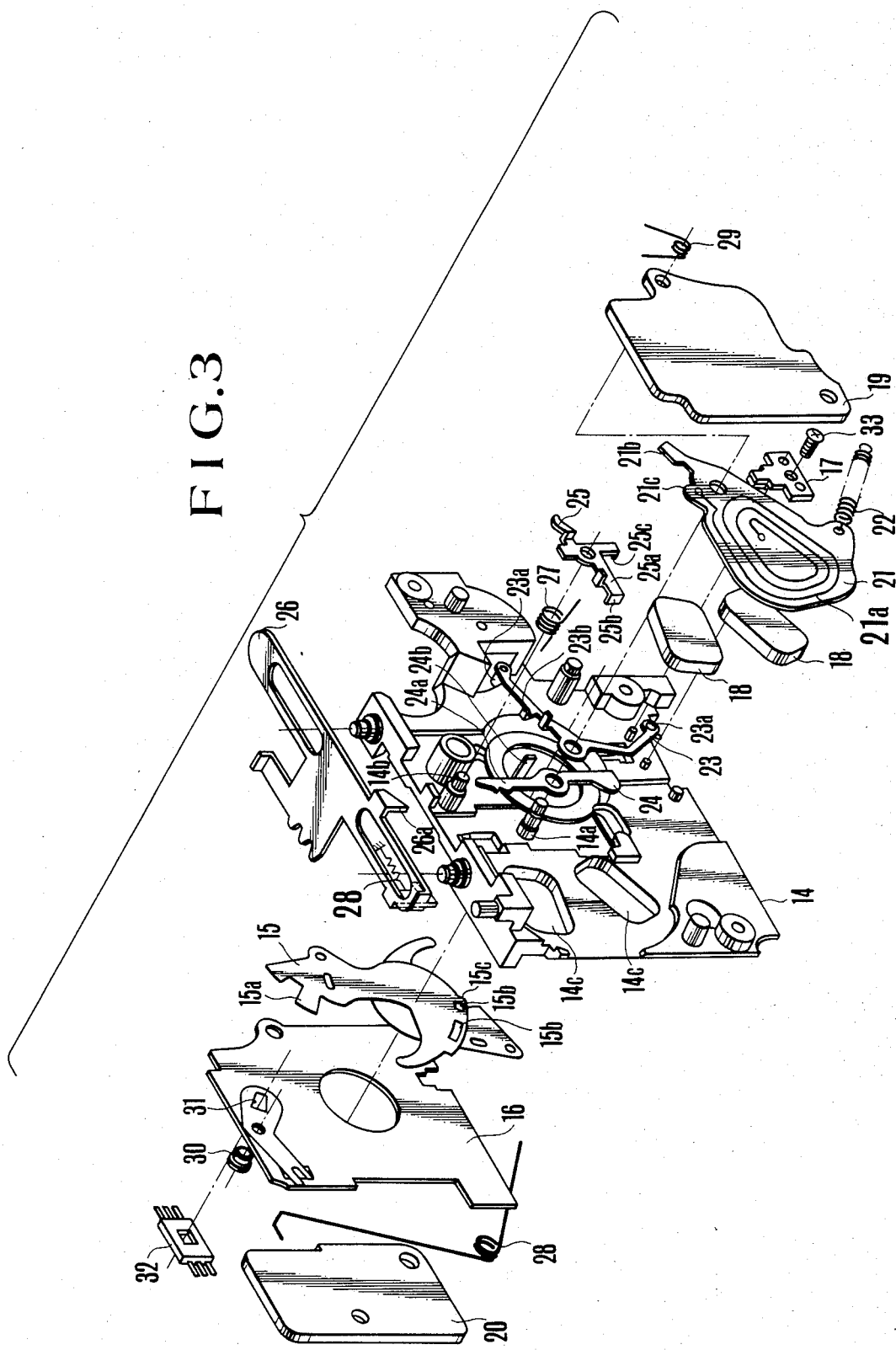
FIG. 3 is an exploded perspective of the shutter mechanism in the camera of FIG. 1.

FIG. 3 illustrates the shutter of the camera according to the present invention in the form of an electromagnetically driven type shutter. In the drawing, the shutter base plate 14 has holes 14c for holding permanent magnets 18 with a fixed magnet circuit by a front yoke 19 and a rear yoke 20. The permanent magnets 18 are in contact with the rear yoke 20 by attraction, and are gapped from the front yoke 19 to provide a magnetic field for a rotor 21 bearing a moving coil 21a (see FIG. 8) thereon. The rotor 21, when supplied with current to the moving coil 21a rotates clockwise, while charging a rotor returning spring 22. A sector lever 23 is rotatably mounted on a rotary shaft 14a of the rotor 21 together with a trigger lever 24 and is connected to drive the shutter blades 15 through respective pins 23a on the sector lever 23.

A latch lever is rotatably mounted about a pivot pin 14b and is urged by a spring 27 to turn in a counterclockwise direction. Also, its arm end 25b is engageable with a pawl 24a of the trigger lever 24 at its first step (upper step as viewed in FIG. 4). Hence, an AF slide 26 for performing a focus adjusting operation is prevented from moving leftward in response to the action of an AF spring 28 by the latching engagement of an extension 25a with a pawl 26a. A spring 29 urges the trigger lever 24 clockwise and counterclockwise, respectively. The sector lever spring 29 is made weaker than the rotor return spring 22 or the electromagnetic drive force. Hence, the sector lever 23 stands ready, is turned counterclockwise or in the illustrated position by the rotor return spring 22, since a receptor 23b is pushed through a sector lever pressor 21b of the rotor 21. When current is supplied to the moving coil 21a on the rotor 21, it is at the first time of the current supply that the cutout portion 21c of the rotor 21 strikes the bent portion 24b of the trigger lever 24 and then turns the latter clockwise. Thus, the latch lever 25 is slightly turned counterclockwise until its arm end 25b engages a second step of the pawl 24a of the trigger lever 24. This permits the AF slide 26 to run down, while the sector lever 23, because its bent portion 23b is being constrained by a bent portion 25c of the latch lever 25, cannot turn clockwise. Then, the termination of the focus adjusting operation is followed by a second time current supply of sufficiently long duration which causes the trigger lever 24 to turn along with the rotor 21. As the latch lever 25 is freed to rotate, it then turns counterclockwise. Thus, the sector lever is released from the latching connection with the latch lever 25 and turns clockwise to move the shutter blades 15 with the result that opening of the exposure aperture goes on.

Light coming from the object to be photographed passes through an auxiliary diaphragm aperture defined by a stationary auxiliary diaphragm blade 31 fixedly mounted to the shutter blade suppressor 16 and an auxiliary diaphragm constituent portion 15a of the shutter blade 15 to enter an IC 32 including a photosensitive element in which it is electrically computed to derive an exposure value. When this exposure value is actually taken, the current supply to the moving coil on the rotor 21 is cut off. Therefore, the rotor return spring 22 powers the rotor 21 together with the sector lever 23 to turn counterclockwise while simultaneously charging or energizing the sector lever spring 29, thus closing the shutter blades 15.

The photo-interpreter 17 is assembled as a unit with a mount member that is assembled with the shutter base plate 14 in a fixedly secure relation by a screw fastener 33. When the shutter blade 15 is moving, a number of FA windows 15b successively block and unblock the path of light from the light projection LED 17a to the light receptor SPC 17b, causing the photointerpreter 17 to produce an electrical signal in the form of pulses representing angular orientations of the shutter blade 15.

Figure 4:
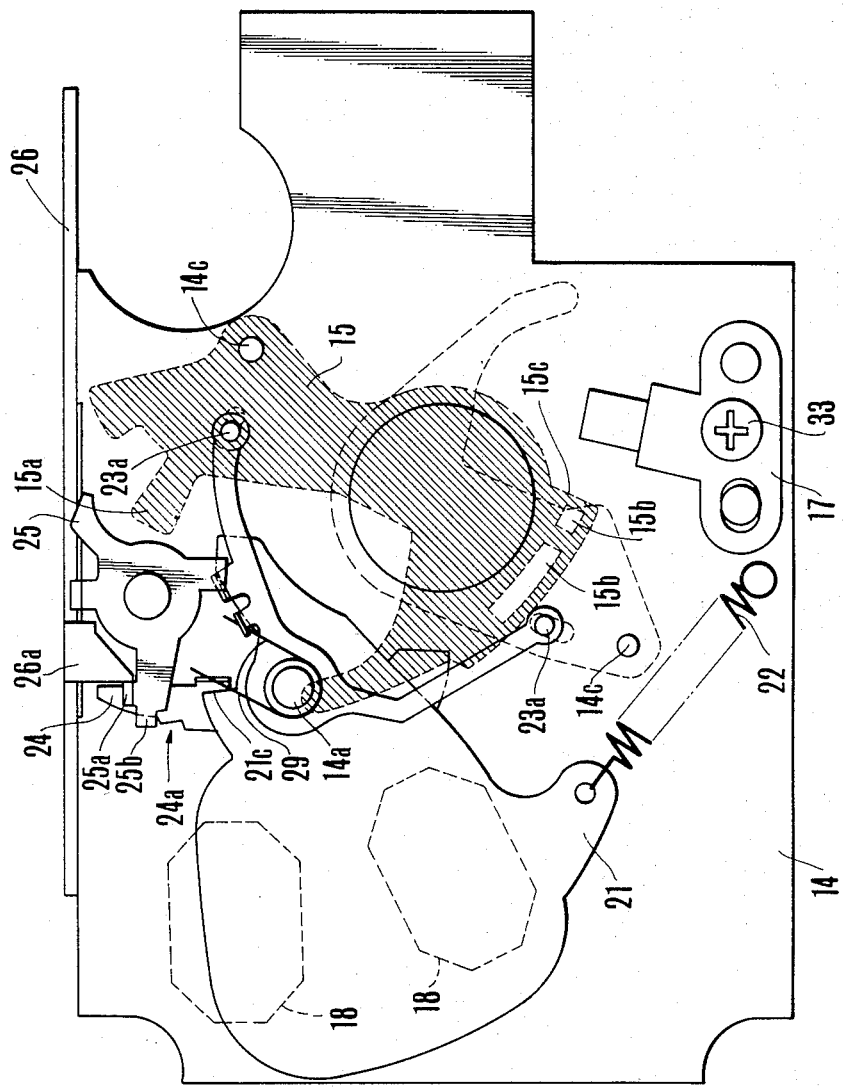
FIG. 4 is an an elevational view of the shutter mechanism of FIG. 3.

FIG. 4 is an elevational view illustrating the shutter of FIG. 3 with the first blade hatched in the closed position (before energization of the moving coil). In this position, the shutter blade 15 is out of alignment with the photo-interpreter 17, and, therefore, the optical path of the photo-interpreter 17 is closed. As the shutter blades 15 are moving in the opening direction, the edge 15c of the first blade opens the optical path, which is again closed by the first window 15b, and so on. This opening and closing procedure is repeated an equal number of times to that of windows 15b in the shutter blade 15 provided that the shutter is fully opened. This serves to produce opening and closing signals representing the different sizes of opening of the diaphragm aperture. It is to be noted in this connection that the doubled number of aperture value data to the number of windows is available.

The position of the edge 15c for first opening the optical path is adjusted so that when making an exposure with ambient illumination, a timing for the count start is set forth. In other words, the optical path of the photo-interpreter is opened in a timing just before the main diaphragm aperture for the path of an image forming light beam starts to open, or in such timing that the auxiliary diaphragm aperture is once totally closed as was changed from the pre-open state.

FIG. 8 illustrates a control circuit of the aforesaid shutter. In this drawing, a light metering circuit 133 includes the aforesaid photosensitive element positioned to receive light coming from the object to be photographed through the auxiliary diaphragm aperture and responsive to the output of this photosensitive element for producing information representing a logarithmically compressed light value. An exposure control circuit 101 has an output which changes from a high level to a low level when the light value information from the light metering circuit 133 has been counted to a predetermined value. A time constant circuit 102 controls a break off time during daylight photography. This time constant circuit 102 changes its output from high to low in about ½ sec. from the count start. A time constant circuit 103 controls a break off time during flash photography, with its output being changed from high to low in about 1/30 sec. (the hand-shake limit time) from the count start.

The three inputs of an AND gate 106 are respectively connected to the output of exposure control circuit 101, the output of AE control time constant circuit 102, and the output of an inverter 107. The input of inverter 107 receives a charge completion signal S2 which changes from low to high when charging of the flash device 2 is completed. The three inputs of AND gate 108 are respectively connected to the output of exposure control circuit 101, the output of FA control time constant circuit 103 and the charging completion signal S2. The outputs of AND gates 106 and 108 are connected to respective inputs of an OR gate 109. An AND gate 110 has two inputs, one of which is connected to the output of OR gate 109, and another of which is connected to an AF completion signal S1 which inverts from low to high when operation of a focus adjusting mechanism (not shown) is terminated. In response to the output of this AND gate 110, a switching transistor 111 turns on, controlling current supply to the coil 21a. Also, in order to allow the AF lever 26 to run down before the opening and closing operation of the shutter blades 15, the coil 21a is energized through another switch (not shown). This is not essential to the present invention, and no dailed explanation is given here.

An inverter 112 inverts the output of AND gate 110, and a delay circuit 113 changes its output to high in a prescribed time (about 3 to 5 msec.) from the moment at which the output of the inverter 112 becomes high. An AND gate 114 has two inputs connected to the outputs of inverter 112 and delay circuit 113 respectively.

A blade orientation sensor circuit 132 includes the aforesaid photo-interpreter 17 and responds to opening of the optical path between the light-projecting LED 17a and the light receiving SPC 17b by the edge 15c of the shutter blade 15 to change its output from low to high. It also responds to closing of the optical path by the window 15b for inverting its output from high to low. Thus, the sensor circuit senses the various angular orientations of the shutter blade 15, or the various actual aperture sizes. A one-shot circuit 120 is responsive to change of the output of the orientation sensor circuit 132 from low to high to produce one pulse signal. A one-shot circuit 121 is responsive to a change of the output of the orientation sensor circuit from high to low to produce one pulse signal. An OR gate 122 has two inputs respectively connected to the outputs of one-shot circuits 120 and 121. A counter 123 serves for counting the pulse signals produced from the OR gate 122, its digital output being connected to one input terminal of a coincidence detecting circuit 131.

A distance signal output circuit 124 produces information representing the distance from the camera to the object found by the automatic focus adjusting device in the form of a digital signal usable in apex computation. A guide number signal output circuit 125 produces information representing the guide number of the flash device. An ASA signal output circuit produces information representing the sensitivity of the used film in the camera 1. The output signals from these circuits are computed (guide number signal—distance signal+ASA sensitivity signal) by using a subtraction circuit 127 and an addition circuit 128 to obtain a proper aperture value for the flash exposure in the form of a digital signal which is then applied to a register 129. A gate 130 responds to change of the signal S2 to a high, or completion of charging of the flash device 2 for connecting an output signal of the register 129 to the other input terminal of the coincidence detecting circuit 131.

The coincidence detecting circuit 131 changes its output from low to high when the content of register 129 and the content of counter 123 coincide. This output is applied to an OR gate 115. Connected to the other input of OR gate 115 is the output of AND gate 114. An AND gate 116 responds to simultaneous occurrence of the output of high level from OR gate 115 and a Q output of high level from an RS flip-flop (hereinafter described as RF-FF) 105 for producing a trigger signal S3 capable of initiating firing of the flash device 2.

The RS-FF 105 is set by the pulse signal produced from the OR gate 122 when the aforesaid auxiliary diaphragm aperture assumes the totally closed position from the pre-open position as the shutter blades 15 operate, and resets by the output of a power-up clear circuit 104 or a pulse signal of short duration produced in response to depression of a shutter button (not shown) on the camera housing. Also the Q output of the RS-FF 105, when changed to a high, initiates a counting operation of each of the exposure control circuit 101, time constant circuit 102 for AE and time constant circuit 103 for FA.

In operation, after the shutter button has been pushed down, and the AF operation is terminated, the AF completion signal S1 becomes high, causing the AND gate 110 to open and therefore permitting the switching transistor 111 to start current supply to the coil 21a. Thus, the rotor 21 starts to rotate clockwise and drives the shutter blades 15 in the opening direction. As this opening movement of the shutter blades 15 goes on, the auxiliary diaphragm aperture transits from the pre-open state to the totally closed state. When the auxiliary diaphragm aperture is totally closed, the optical path between the light projection element (LED) 17a and the photosensitive element (SPC) 17b is first opened so that the OR gate 122 produces a high pulse signal which is applied to set the RS-FF 105. Since, at this time, the Q output of RS-FF 105 inverts from low to high, the exposure control circuit 101 is ready for counting the information from the light metering circuit 133 when the auxiliary diaphragm aperture opens again as the shutter blades further move. That is, it is at this time that the exposure control circuit 101 is set to start counting, and at the same time, the time constant circuits 102 and 103 also start a timing operation.

If, at this time, full charging of the flash device 2 is completed, the output of AND gate 106 is always low. Therefore, the switching transistor 111 is left conducting until the output of the exposure control circuit 101 becomes low, or until the output of the time constant circuit 103 for FA becomes low in about 1/30 sec. from the initiation of exposure of the film. Otherwise, if full charging of the flash device 2 is not completed, the output of AND gate 108 goes low. Therefore, the switching transistor 111 turns off when the output of exposure control circuit 101 or time constant circuit 102 for AE becomes low.

When the coil 21a is de-energized, the rotor 21 after having gone somewhat further clockwise by inertia starts to turn counter-clockwise in response to the force of the bias spring 22. Then, the shutter blades 15 are driven to move in a closing direction. Such change of the output of AND gate 110 to low level also causes change of the output of inverter 112 to a high by which the delay circuit 112 is actuated. In a time interval of about 3 to 5 msec. from the de-energization of the coil 21a, the output of AND gate 114 is then changed to high, and a trigger signal S3 is produced through the OR gate 115 and AND gate 116. This is because, despite the coil 21a having been de-energized, the inertia of the rotor 21 acts to further open the shutter blades 15 and for the flash device 2 to be fired just when the shutter blades 15 turn around at a maximum size of aperture opening formed.

On the other hand, as the opening operation of the shutter blades 15 goes on, the edge 15c and windows 15b block and unblock the optical path of the photo-interpreter 17 in conformance with the discrete values of the diaphragm aperture formed by the shutter blades 15. This permits digital signals corresponding to the aperture values to enter the counter 123 in sequence. Also, at this time, the register 129 already stores the proper aperture value signal for flash exposure determined by the guide number of the flash device 2, ASA sensitivity of the used film and the camera-to-object distance in the digital form. Therefore, when the content of the counter 123 coincides with the content of the register 129, the output of the coincidence detecting circuit 131 becomes high level. Hence, if the change of the output of AND gate 114 to a high is preceded by the detection of coincidence between the contents of counter 123 and register 129, the output of the coincidence detecting circuit 131 passes through the OR gate 115 and AND gate 116 to serve as the trigger signal S3.

The foregoing operation may now be summarized as follows:

When the main switch 4 of the flash device 2 is thrown, the main condenser or capacitor is charged. When the voltage on the main capacitor reaches a satisfactory operating level, the flash device 2 produces the signal S2 by which the camera is switched from the daylight exposure mode to the flash exposure mode so that the break-off time of the shutter operation is changed from the longest (for example, ½ sec.) to a hand-shake-free time (for example, 1/30 sec.).

The trigger signal S3 from the X-contact appears when the position of the opening blades detected by the photo-interpreter 17 has been conformed with the aperture value computed by the guide number of the flash device, the camera-to-object distance and the film speed (ASA) as the outside illumination is so dark. The signal S3 is transmitted from the camera body 1 to the flash unit 2, so the flash tube is fired.

After the emission of a flash, the shutter blades 15 are closed when the amount of light coming from the object with the complex illumination (ambient illumination plus flash illumination) and entering through the auxiliary diaphragm aperture is integrated to a prescribed level, or when the break-off time is reached. If the ambient illumination is so intense that before the main diaphragm aperture reaches a value large enough to actuate the flash system, the integrated amount of light due to the ambient illumination reaches the prescribed level, the shutter blades 15 are closed at such a timing as to effect a correct exposure under the ambient illumination. The flash device is fired at such timing that the main diaphragm aperture takes a peak of the half-opening waveform, or a maximum value of opening area (which occurs in a 3 to 5 msec. from the appearance of the closing signal because of the mechanical response gap). Thus, the subject of principal photographic interest is given a supplementary illumination. In this way, the size of diaphragm aperture for complex illumination is reduced from that of diaphragm aperture for daylight illumination alone and the exposure time though in a daylight mode can be limited within the break-off time due to the hand-shake, when the subject of principal photographic interest and its environment are both well photographed by flash synchronization in daylight. Also even in such a situation that the flash exposure requires a larger aperture opening than that of aperture opening for daylight exposure, it is possible to make a proper exposure for the background, while permitting as good an exposure correction as possible to the subject of principal photographic interest to be carried out. Thus, the possibility of taking a portrait with the face in the dark because of back lighting, for example, is substantially reduced. This is due to the fact that the flash exposure of the present invention is carried out by the charging completion signal from the flash unit 2 for setting on the flash exposure mode, and the flash tube is fired at the proper diaphragm aperture without suffering from the mechanical restriction of the process of action of the shutter blades 15.

Figure 5:
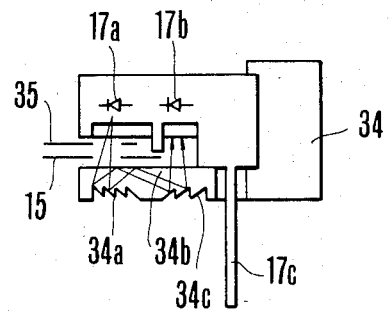
FIG. 5 is a sectional view of an embodiment of a photo-interpreter used in the camera of the invention.
Figure 6:
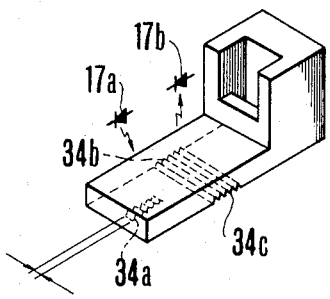
FIG. 6 is a perspective view of the cross-projection plate in the photo-interpreter of FIG. 5.

FIG. 5 is a sectional view of the photo-interpreter 17 according to the present invention. The interpreter holder 34 is provided with a first reflecting surface 34a of Fresnel form composed of a great number of reflector elements in an array, a total reflection surface 34 and a second Fresnel-shaped reflection surface 34c. Hence, despite a very narrow space, light can be effectively transmitted. As illustrated in the drawing, light emerging from LED 17a for light projection is reflected from the Fresnel-shaped reflection surface 34 to the total reflection surface 34b and after a number of reflections therefrom is directed to the SPC 17b as a light sensor. In the drawing, a mask 35 has a slit in a direction perpendicular to the direction of movement of the shutter blade 15. This mask 35 is used for the purpose of improving the accuracy of detecting of the actual aperture size. But, as illustrated in FIG. 6, the width of the Fresnel-like reflection surface 34a is narrowed relative to the width of the 2nd one 34c to make the area surrounding the reflection surface 34a light-permeable so that this may be used as a substantial mask. If so, the mask 35 may be omitted. Thus, the use of the reflection surface in the Fresnel form makes it possible to make the reflection plate thin and to install such a reflection plate in a narrow space.

In the present embodiment, the holder 34 is assembled with the photo-interpreter 17 in advance by adhesive means. But, it is also possible to otherwise mark the Fresnel-like reflection surface composed of a great number of reflector elements on the shutter blade suppressor. This offers the advantage that the necessary number of parts is reduced, and the position determination and adjustment operation for that part is no longer necessary. That contributes to a reduction of the assembly cost.

Figure 7:
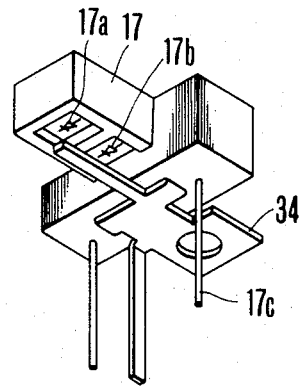
FIG. 7 is a perspective view of another embodiment of the photo-interpreter.

FIG. 7 is a perspective view illustrating another embodiment of the photo-interpreter. The holder 34 is made as a common line of the photo-interpreter 17 and to be of a metal type also usable for installation before the packaging operation. The reflection surface is plated or clad with a color metal having a high reflectance for the red light from the LED, for example, gold (Au). This improves the light transmittance. The use of the holder member as a pole for the lead of wire in such a way can reduce the thickness of the photo-interpreter.

The LED for light projection of the present embodiment is an LED for infrared light with the advantage that since the normal film is insensitive to infrared light, the photo-interpreter can be positioned near the diaphragm aperture so that the compactness of the camera can be further enhanced.

As has been described in greater detail above, the present invention serves to provide for the diaphragm-cum-shutter blades with means for sensing the angular orientation of the shutter blades in such form that the optical path between the light projection element and the light sensitive element is blocked and unblocked when said blades change their angular orientation with the change of the size of aperture opening. The invention contemplates the use of the one of outputs of the sensing means which represents the fact that the auxiliary diaphragm aperture transits from the pre-open state to the totally closed state in actuating the exposure control circuit to start counting. Therefore, the half open type shutter capable of pre-light metering by the auxiliary diaphragm aperture, therefore, and without having to adversely affect the operation of the blades permits initiation of counting of the light metering information when the auxiliary diaphragm aperture is totally closed. Also, according to the present invention, even in a photographic situation where the object brightness level is very low, it is possible to assure the initiation of the counting.

The present invention also serves to detect the value of the exposure aperture by the output of said sensing means and upon attainment of this to a proper one for flash exposure to fire the flash device. This makes it possible always to optimize the firing timing of the flash device even during daylight photography.

It is to be noted that though the present embodiment has been described in connection with the camera ahd the flash device in separate units, the present invention is not confined thereto. Needless to say the present invention is applicable to cameras having flash devices incorporated therein.

What we claim:

1. An exposure control device for a camera comprising:
   blade members forming a photographic main aperture and an auxiliary aperture for measuring light from an object to be photographed, said auxiliary aperture being arranged to be opened and closed with the main aperture, the auxiliary aperture being arranged so that when blade members move to open the auxiliary aperture changes from a pre-open state to a totally closed state, and then opens again in response to opening of the aforesaid main aperture;
   a light receiving element for measuring light, from an object to be photographed, through said auxiliary aperture;
   exposure control means for counting light metering information from said light receiving element and upon attainment of a count to a prescribed value to initiate a closing operation of said blade members; and
   detecting means having a light projection element and a light receiving element and responsive to opening and closing of an optical path between said light projection element and said light receiving element by action of said blade members for detecting the totally closed position of the auxiliary aperture, said detecting means being arranged to cause said exposure control means to start counting when said auxiliary aperture is totally closed from the pre-open state.

2. An exposure control device according to claim 1, said detecting means further detects the opening positions of said blade members for reading an aperture value of said main aperture from information of the opening positions of said blade member, and further comprising:
   first trigger means responsive to attainment of the aperture value of said main aperture to one proper for a flash exposure for producing a signal for firing a flash device.

3. An exposure control device according to claim 2, further including:
   (e) second trigger means responsive to initiation of a closing operation of said blade members for producing a signal for firing the flash device.

4. An exposure control device according to claim 3, wherein the light projection element and the light receiving element of said detecting means are positioned on the same side of said blade members, and light from the light projection element is directed to the light receiving element by a reflection member.

* * * * *